April 22, 1952     D. S. WEISS     2,594,239
LOCKING PIN
Filed Dec. 12, 1947

INVENTOR.
Dewey S. Weiss
BY
Attorney

Patented Apr. 22, 1952

2,594,239

UNITED STATES PATENT OFFICE 2,594,239

LOCKING PIN

Dewey S. Weiss, Portland, Oreg.

Application December 12, 1947, Serial No. 791,193

4 Claims. (Cl. 85—7)

My present invention relates to a locking pin for uniting two or more objects such as a bar and a bracket to which the bar is to be attached, a clevis and a drawbar, a pair of plates, or any other similar objects having holes therethrough.

The principal object of the present invention is to provide means for uniting objects which are provided with openings adapted to be aligned to permit the reception of a locking pin, the invention being characterized by a locking pin of such nature that it will be retained in position in the absence of intelligent manipulation.

An object of the present invention is to provide a self-locking pin which is readily insertable into aligned openings but which may not be removed without the exercise of intelligent manipulation.

A further object of the present invention is to devise a locking pin of sturdy construction which may be easily manufactured and assembled.

The objects and advantages of the present invention will be more readily understood by reference to the accompanying drawing taken in connection with the following specification wherein like numerals refer to like parts throughout, while the features of novelty will be more distinctly pointed out in the appended claims.

In the drawings,

Fig. 1 discloses an embodiment of the present invention designed for utilization in connection with a clevis-like member to which is to be united a tongue such as a narrow drawbar;

Figures 1, 2:
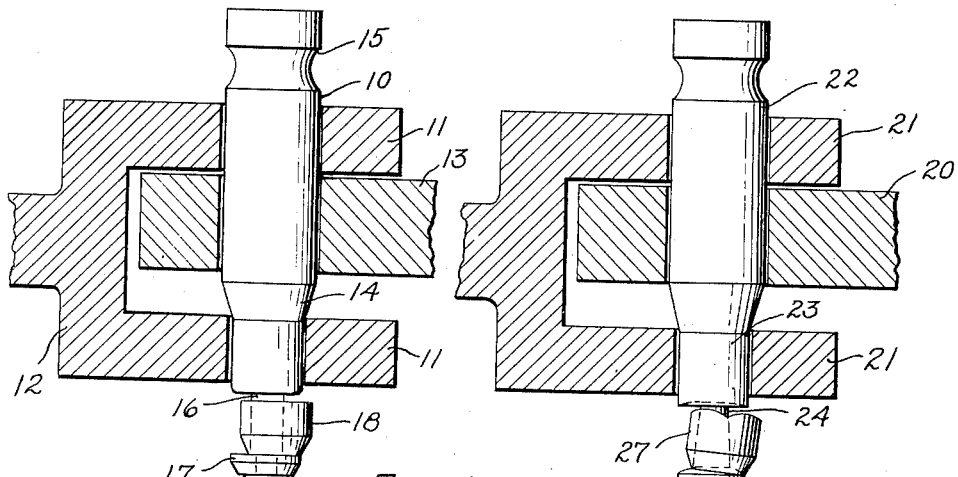
Fig. 2 is a vertical section through a pair of members united by a modified form of the present invention.

In Fig. 1, there is disclosed a locking pin comprising a substantially cylindrical stem 10 inserted through aligned openings in the arms 11 of a clevis member 12 and a tongue 13 embraced by the arms 11. The entering end of the stem 10 is preferably of slightly reduced diameter, being separated from the main body by a tapered portion 14, the opening through one of the arms 11 being of reduced diameter to prevent the pin from slipping all of the way through. By having the stem so formed, the head of the pin need not be enlarged and may simply be provided with an annular groove 15 to permit it to be grasped. A coaxial extension 16 of reduced diameter is provided on the entering end and a coaxial enlargement 17 is provided at the entering end of the extension, the diameter of the enlargement being preferably substantially the same as the diameter of the portion of the stem adjacent the extension 16. The outer face of the enlargement 17 is preferably tapered toward the entering end of the pin so as to provide for easy insertion thereof. The stem and the enlargement provide shoulders for retaining an annular collar 18, the outer diameter of the collar being substantially the same as the adjacent portions of the stem and enlargement, and the inner diameter of the collar being greater than the diameter of the extension but not greater than the sum of the radii of the enlargement 17 and of the extension 16. The entering end of the collar 18 is preferably tapered toward the entering end of the pin so that, when the collar is moved toward one side as shown in Fig. 1, the tapering surfaces of the collar and of the enlargement will be substantially aligned at one point, and all other portions of the entering edge of the collar will be within the confines of the enlargement 17. Thus the pin may be rapidly inserted through an opening without requiring care to align the collar and the stem or the enlargement. However, when the pin has been inserted, the collar will seldom, if ever, naturally align itself with the stem; and some portion of the trailing end thereof will engage the clevis to prevent withdrawal of the pin, unless the collar is manipulated into perfect alignment.

In Fig. 2, a modification is disclosed wherein a tongue-like member 20 is united to arms 21 of a clevis member by a locking pin 22 having characteristics similar to that previously described. In this modification, the stem portion 23, adapted to pass through the smaller opening in an arm 21, supports an extension 24 of reduced diameter, the diameter thereof being progressively enlarged toward the outer end thereof. A screw 25 is threaded into a conical bore in the end of the extension 24 and supports an annular enlargement 26, the entering edge of which matches the rim of the head of screw 25 and the largest diameter of which is substantially the same as the diameter of the stem portion 23. An annular collar 27 loosely surrounds the extension 24 in the space between the shoulders provided by the stem 23 and the enlargement 26. The largest outer diameter of the collar is substantially the same as the diameter of the stem portion 23 and the inner diameter is larger than the greatest diameter of the extension 24 but equal to or less than the sum of the radii of the enlargement 26 and the extension 24 at the junction thereof. Preferably the trailing edge of the enlargement 26 is rounded or tapered rearwardly so as to provide a sloping rest for the collar 27, causing it to cant toward one side with its inner surface in contact with the tapered surface of the extension 24. Thus, even though the pin may be used in a vertical position, the collar will never accidentally align itself with the stem. Preferably, a leaf spring 28 is retained against the end of the extension 24 by passing the screw 25 therethrough, the spring having a rearwardly extending resilient end engaging the inner surface of the collar 27 to force it out of alignment. A further refinement comprises providing the trailing end of the collar 27 with a scalloped edge, and undercutting the shoulder surrounding the trailing end of the extension 24. Thus, if the pin tends to disengage, one of the scallops will engage an arm 21 and force an opposing scallop into the undercut portion of the stem, thus enhancing the safety of the device. As previously described, the entering end of the collar 27 is preferably tapered toward the tip of the pin so as to provide a portion which is of practically the same diameter as the enlargement 26 so that, as seen in Fig. 5, the pin may be inserted without manipulation of the collar.

Figures 3, 4, 5:
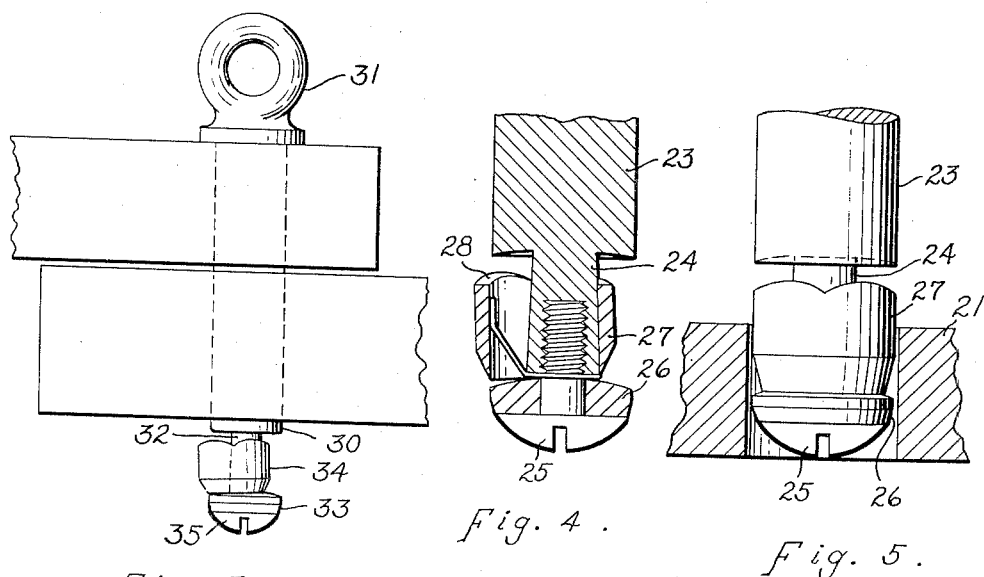
Fig. 3 is a view of a pair of plates united by a modified form of the present invention.
Fig. 4 is a vertical, central section on an enlarged scale of the entering end of a locking pin such as disclosed in Fig. 2.
Fig. 5 is an enlarged view of the entering end of a locking pin entering an opening in a member to be locked to some other member.

The modification disclosed in Fig. 3 is particularly designed for the uniting of two solid plates. The modifications of Figs. 1 and 2 may suit most installations, particularly if the clevis and the tongue have been designed with openings of different diameter as illustrated. However, many implements may not be so designed and might be provided with openings of the same diameter in which case a pin comprising a straight, cylindrical stem 30 may be provided with an enlarged head 31 to prevent the pin from passing all the way through the members. The stem supports a coaxial extension 32 of reduced diameter having an outwardly tapered surface into which is screwed a coaxial screw 35 supporting an enlargement 33 as described with respect to Fig. 2. A collar 34 having an entering edge tapered inwardly and having the characteristics of the collar described with respect to Fig. 2 is mounted upon the entering end of the pin.

A feature of considerable importance with respect to the modifications of Figs. 1 and 2 resides in the dimensioning of the collar and extension such that the maximum radius which may be achieved by any portion of the collar when it has been withdrawn into a wide gap between an arm of the clevis and the tongue 20 is less than the major radius of the pin 22. Thus the pin may be withdrawn through the larger opening in the tongue 20 and the other arm of the clevis without requiring the use of some fine implement inserted between the two members to move the collar into alignment. A pin such as disclosed in Fig. 3, however, might become jammed if a space existed between the plates of a width greater than the length of the collar 34.

In the modification of Figs. 2 and 3 the scalloped edge of the collar and the undercut shoulder on the stem cooperate in furthering the safety of the device in providing means to assure canting of the collar if the pin should be positioned with the collar uppermost, the undercut shoulder being complementary to the surface of the enlargement 26.

While various features have been disclosed in certain combinations, it is to be appreciated that they may be arranged in other combinations. For example, a spring such as spring 28 may be incorporated in any form of the device or any form of the device may be provided with a rounded or tapered shoulder on the enlargement, or a tapered extension, to cause the collar to cant. Similarly, the spring 28 is illustrative of other resilient means which may be utilized normally to hold the collar at an eccentric position. Also the cross-sections of the pin and collar may be other than circular without departing from the invention.

While I have herein illustrated several preferred forms which the invention may assume, it is to be appreciated that other modifications in arrangement and detail may be devised. All such modifications as come within the true spirit and scope of the appended claims are considered to be a part of my invention.

I claim:

1. A locking pin comprising a cylindrical stem portion, a coaxial extension of reduced diameter at the end of said stem portion, a coaxial enlargement of substantially the same diameter as said stem portion at the end of said extension, said stem and said enlargement defining opposed shoulders at the ends of said extension, and an annular collar loosely surrounding said extension, said collar having an external diameter substantially equal to the diameter of said stem portion and an internal diameter substantially equal to the sum of the radii of said enlargement and of said extension, the surface of said shoulder on said enlargement surrounding said extension being sloped away from said extension, the length of said collar being materially less than the length of said extension between said shoulders so as to permit limited axial play of said collar thereupon.

2. A locking pin comprising a cylindrical stem portion, a coaxial extension of reduced diameter at the end of said stem portion, a coaxial enlargement of substantially the same diameter as said stem portion at the end of said extension, said stem and said enlargement defining opposed shoulders at the ends of said extension, and an annular collar loosely surrounding said extension, said collar having an external diameter substantially equal to the diameter of said stem portion and an internal diameter substantially equal to the sum of the radii of said enlargement and of said extension, the shoulder defined by said enlargement being sloped outwardly from said extension, and said extension being of progressively increasing diameter toward said enlargement, the length of said collar being materially less than the length of said extension between said shoulders so as to permit limited axial play of said collar thereupon.

3. A locking pin comprising a cylindrical stem portion, a coaxial extension of reduced diameter at the end of said stem portion, a coaxial enlargement of substantially the same diameter as said stem portion at the end of said extension, said stem and said enlargement defining opposed shoulders at the ends of said extension, and an annular collar loosely surrounding said extension, said collar having an external diameter substantially equal to the diameter of said stem portion and an internal diameter substantially equal to the sum of the radii of said enlargement and of said extension, the surface of said shoulder on said enlargement surrounding said extension being sloped away from said extension, said extension being of progressively increasing diameter toward said enlargement, the surface of the shoulder on said stem being undercut, the end of said collar facing said stem being scalloped, and the end of said collar facing said enlargement being tapered inwardly toward said enlargement, the maximum length of said collar being materially less than the length of said extension between said shoulders so as to permit limited axial play of said collar thereupon.

4. A locking pin comprising a cylindrical stem portion, a coaxial extension of reduced diameter at the end of said stem portion, a coaxial enlargement of substantially the same diameter as said stem portion at the end of said extension, said stem and said enlargement defining opposed shoulders at the ends of said extension, and an annular collar loosely surrounding said extension, said collar having an external diameter substantially equal to the diameter of said stem portion and an internal diameter substantially equal to the sum of the radii of said enlargement and of said extension, the surface of said shoulder on said enlargement surrounding said extension being sloped away from said extension, said extension being of progressively increasing diameter toward said enlargement, the surface of the shoulder on said stem being undercut, the end of said collar facing said stem being scalloped, the end of said collar facing said enlargement being tapered inwardly toward said enlargement, and said locking pin having a cylindrical body portion of larger diameter than said stem portion and a tapered portion joining said stem portion to said body portion, the maximum length of said collar being materially less than the length of said extension between said shoulders so as to permit limited axial play of said collar thereupon.

DEWEY S. WEISS.

REFERENCES CITED

The following references are of record in the file of this patent:

UNITED STATES PATENTS

| Number | Name | Date |
|---|---|---|
| 1,140,036 | Hella | May 18, 1915 |
| 1,629,925 | Moore | May 24, 1927 |
| 1,643,586 | Ratigan | Sept. 27, 1927 |